United States Patent
Mahmoud et al.

(10) Patent No.: US 9,426,010 B1
(45) Date of Patent: *Aug. 23, 2016

(54) ADAPTIVE SYMBOL TRANSITION METHOD FOR OFDM-BASED COGNITIVE RADIO SYSTEMS

(71) Applicants: Hisham A. Mahmoud, San Jose, CA (US); Huseyin Arslan, Tampa, FL (US)

(72) Inventors: Hisham A. Mahmoud, San Jose, CA (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,151

(22) Filed: Jun. 22, 2015

Related U.S. Application Data (63) Continuation-in-part of application No. 14/064,790, filed on Oct. 28, 2013, now Pat. No. 9,106,324, which is a continuation-in-part of application No. 12/275,721, filed on Nov. 21, 2008, now Pat. No. 8,571,136.

(60) Provisional application No. 60/989,487, filed on Nov. 21, 2007.

(51) Int. Cl.
*H04B 15/00* (2006.01)
*H04L 27/26* (2006.01)

(52) U.S. Cl.
CPC ........... *H04L 27/2601* (2013.01); *H04B 15/00* (2013.01)

(58) Field of Classification Search
CPC . H04B 1/0003; H04B 15/00; H04L 27/2601; H04L 27/2607
See application file for complete search history.

(56) References Cited

U.S. PATENT DOCUMENTS

| 6,546,055 B1* | 4/2003 | Schmidl | H04L 27/2676 375/220 |
|---|---|---|---|
| 7,133,355 B1 | 11/2006 | Gerakoulis | |
| 7,158,474 B1 | 1/2007 | Gerakoulis | |

(Continued)

FOREIGN PATENT DOCUMENTS

| DE | 102005016717 A1 | 11/2006 |
|---|---|---|
| JP | 2004312674 A | 11/2004 |
| WO | 0141387 A1 | 6/2001 |

OTHER PUBLICATIONS

Yamaguchi, H. "Active interference cancellation technique for MB-OFDM cognitive radio." Microwave Conference. 34th European. vol. 2. Oct. 13, 2004. pp. 1105-1108.

Brandes, S.; Cosovic, I.; Schnell, M. "Reduction of out-of-band radiation in OFDM systems by insertion of cancellation carriers." Communications Letters. IEEE. vol. 10. Issue 6. Jun. 2006. pp. 420-422.

(Continued)

*Primary Examiner* — Jean B Corrielus
(74) *Attorney, Agent, or Firm* — Molly L. Sauter; Smith & Hopen, P.A.

(57) ABSTRACT

Modulated orthogonal frequency division multiplexing (OFDM) subcarriers generate high sidelobes, resulting in adjacent channel interference (ACI). Current sidelobe suppression techniques, such as inserting guard intervals or cancellation carrier bands, diminish the useful radio spectrum or consume significant wireless device resources. Disclosed is a method of suppressing sidelobes through adding an adaptive extension to OFDM symbols that is calculated to avoid ACI while keeping power consumption to low levels. Bandwidth and user location information are collected by a cognitive radio an utilized to determine the extension used. The method significantly reduces ACI to other bands and reduces the required guard bands, opening the radio spectrum to more efficient use.

14 Claims, 6 Drawing Sheets

(56) References Cited

U.S. PATENT DOCUMENTS

| | | | |
|---|---|---|---|
| 7,394,859 B2* | 7/2008 | Mitsugi | H04L 25/0232 |
| | | | 375/260 |
| 8,290,105 B2* | 10/2012 | Nagata | H04L 5/026 |
| | | | 327/141 |
| 2004/0066802 A1* | 4/2004 | Ro | H04L 27/2607 |
| | | | 370/528 |
| 2005/0129136 A1* | 6/2005 | Fujii | H04L 1/0071 |
| | | | 375/260 |
| 2006/0077885 A1 | 4/2006 | Schnell et al. | |
| 2006/0133261 A1 | 6/2006 | Cosovic et al. | |
| 2007/0086329 A1* | 4/2007 | Glazko | H04L 27/2607 |
| | | | 370/208 |
| 2009/0245413 A1* | 10/2009 | Miyoshi | H04L 27/2607 |
| | | | 375/295 |

OTHER PUBLICATIONS

Cosovic, I.; Brandes, S.; Schnell, M. "Subcarrier weighting: a method for sidelobe suppression in OFDM systems." Communications Letters. IEEE. vol. 10. Issue 6. Jun. 2006. pp. 444-446.

Brandes, S.; Cosovic, I.; Schnell, M. "Sidelobe suppression in OFDM systems by insertion of cancellation carriers." Vehicular Technology Conference. 2005. VTC-2005-Fall. 2005 IEEE 62nd. vol. 1. Sep. 28-25. pp. 152-156.

Cabric et al., Implementation Issues in Spectrum Sensing for Cognitive Radios, Signals, Systems and Computers, 2004. Conference Record of the Thirty-Eighth Asilomar Conference on, vol. 1, Nov. 2004, pp. 772-776.

Gander, Least Squares with a Quadratic Constraint, Numer. Math. 1981, 36, pp. 291-307.

Mitola et al., Cognitive radio: making software radios snore personal, IEEE Personal Communications, Aug. 1999, vol. 6, No. 4, pp. 13-18.

Naylor and Tahic, Apodizing functions for Fourier transform spectroscopy. J. Opt. Soc. Am. A. Nov. 2007, 24:11, pp. 3644-3648.

T. Weiss and F. K. Jondral, "Spectrum pooling: an innovative strategy for the enhancement of spectrum efficiency," IEEE Commun. Mag., Mar. 2004, vol. 42, No. 3, pp. 8-14.

T. Weiss, et al. "Mutual interference in OPDM-based spectrum pooling systems," in Proc. IEEE Veh. Technol. Conf., vol. 4, May 2004, pp. 1873-1877.

Translation of DE 102005016717 (filing date: Apr. 11, 2005) with a publication date of Nov. 2, 2006: Inventor: Cosovic, Ivan.

* cited by examiner

FIG. 8

ADAPTIVE SYMBOL TRANSITION METHOD FOR OFDM-BASED COGNITIVE RADIO SYSTEMS

CROSS REFERENCE TO RELATED APPLICATION

This application is a continuation-in-part of and claims priority to U.S. Nonprovisional patent application No. 14/064,790, entitled "Adaptive Symbol Transition Method for OFDM-Based Cognitive Radio Systems", filed Oct. 28, 2013, now U.S. Pat. No. 9,106,324 issued Aug. 11, 2015, which is a continuation-in-part of and claims priority to U.S. Nonprovisional patent application No. 12/275,721, entitled "Adaptive Symbol Transition Method for OFDM-Based Cognitive Radio Systems", filed Nov. 21, 2008, now U.S. Pat. No. 8,571,136 issued Oct. 29, 2013, which claims priority to U.S. Provisional Patent Application No. 60/989,487, entitled "Adaptive Symbol Transition Method for OFDM-Based Cognitive Radio", filed Nov. 21, 2007, all of which are incorporated herein by reference in their entireties.

FIELD OF INVENTION

This invention relates to spectrum shaping for cognitive radio applications. Specifically, the invention relates to a method for sidelobe suppression in OFDM-based systems.

BACKGROUND OF THE INVENTION

The increasing use of wireless communication systems for voice-only communications, interactive Internet data, and multi-media applications, as well as higher data rate transmission requirements have consumed much of the available wireless spectrum. Recently, opportunistic usage of Licensed frequency bands have been utilized as a solution to spectral crowding problem by using cognitive radio (CR) systems (J. Mitola and G. Q. Maguire Jr., "Cognitive radio: making software radios snore personal," *IEEE Personal Communications*, vol. 6, no.4, pp. 13-18, August 1999; T. Weiss and F. K. Jondral, "Spectrum pooling: an innovative strategy for the enhancement of spectrum efficiency," *IEEE Commun. Mag.*, vol. 42, no. 3, pp. 8-14. March 2004). Cognitive radio system are known in the art, and can be described as software defined radio with a "cognitive engine", wherein the cognitive engine monitors the performance of the radio, by receiving signals from the antennas to determine the RF environment, channel conditions, link performance, etc., and configures the radio settings to comply with user requirements, operational limitations and possibly regulatory constraints. In response to the performance of the radio, and possibly user input, the cognitive engine configures the radio to adjust one or more factors including, waveform, protocol, operating frequency, etc., of the radio signal to meet a desired qualify of service.

A key point for the success of CRs is the ability to shape its signal spectrum as to achieve minimum interference to licensed users (LUs) operating in the used band. However, to achieve this objective, the system physical layer (PHY) needs to be highly flexible and adaptable. Future technologies will face spectral crowding, and coexistence of wireless devices will be a major problem. Considering the limited bandwidth availability, accommodating the demand for higher capacity and data rates is a challenging task, requiring innovative technologies that can offer new ways of exploiting the available radio spectrum, such as cognitive radio. (Mitola, J. and J. Maguire, G. Q., "Cognitive radio: making software radios more personal," *IEEE Personal Commun. Mag.*, vol. 6, no. 4, pp. 13-18, August 1999).

Multi-carrier techniques, specifically orthogonal frequency division multiplexing (OFDM), are commonly used in modern wireless communications systems and have the potential of fulfilling the requirements of CR. By dividing the spectrum into subbands that are modulated with orthogonal subcarriers, OFDM spectrum can be shaped with more ease compared to other signaling techniques. OFDM utilizes sinctype pulses to represent symbols transmitted over subcarrier signals, resulting in large sidelobes. These sidelobes may interfere with the signal transmissions of neighboring legacy systems, causing adjacent channel interference (ACI) between the transmissions.

Figure 1:
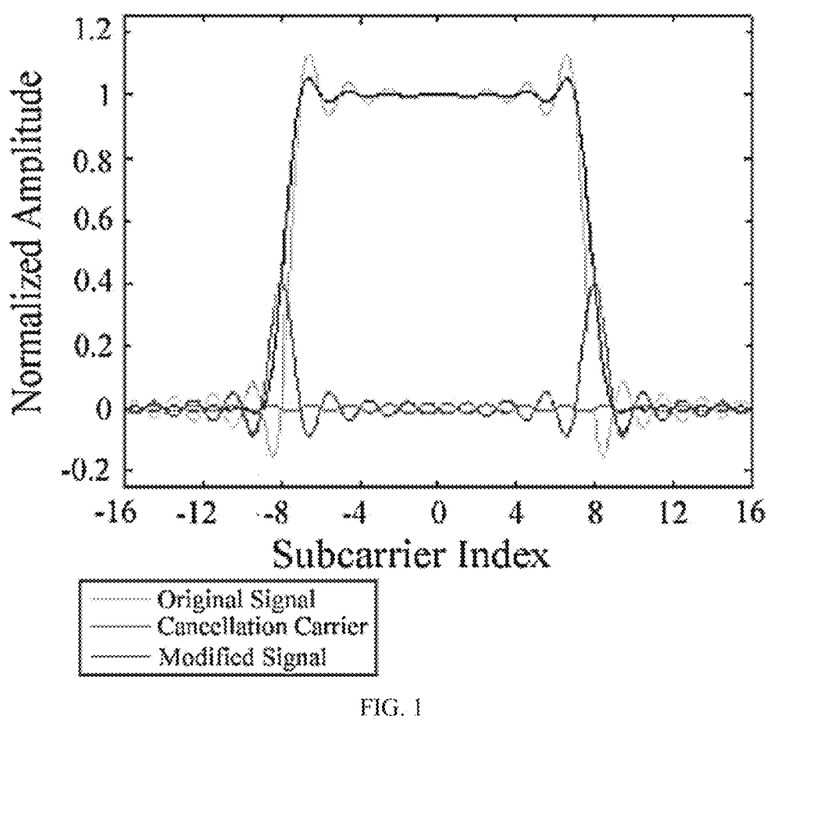
FIG. 1 is a graph of subcarrier amplitudes of OFDM signals before and after modification with cancellation carrier signals.

Disabling a set of OFDM subcarriers to create a spectrum null may not be sufficient to avoid interference to LU. Sidelobe suppression is a relatively new field, with only a few sidelobe suppression techniques available. These techniques transmit large volumes of information to the receiver to attain interference suppression. Techniques include guard bands on both sides of used OFDM spectrum coupled with windowing of the time-domain symbols (T. Weiss, J. Hillenbrand, A. Krohn, and F. K. Jondral. "Mutual interference in OPDM-based spectrum pooling systems," in *Proc. IEEE Veh. Technol. Conf.*, vol. 4, May 2004, pp. 1873-1877), interference cancellation carriers (CCs) (H. Yamaguchi, "Active interference cancellation technique for MB-OFDM cognitive radio," in *Proc. IEEE European Microwave Conf.*, vol. 2, October 2004, pp. 1105-1108; S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006), or subcarrier weighting (I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006). CC techniques can significantly suppress OFDM sidelobes, as seen in FIG. 1, but result in an increase in the system peak-to-average-power ratio (PAPR) and the performance is sensitive to the cyclic prefix (CP) size. CC forces the transmitter and/or receiver to undertake significant computational analysis, increase the system complexity and introduce long delays. Moreover, due to the higher power used for the CCs, using this technique affects the spectral flatness of the transmitted signal and can increase the inter-carrier interference (ICI) effect in case of a Doppler spread or a frequency offset error at the receiver. On the other hand, subcarrier weighting method causes an increase in the system bit error rate (BER) and the interference reduction is not as significant as it is with the CC method.

Accordingly, a method for reducing signal interference while maximizing receiver resources is needed in the art.

SUMMARY OF THE INVENTION

A new method, referred to as adaptive symbol transition (AST), is shown to suppress OFDM side-lobes and shape the signal spectrum. Similar to windowing technique, the OFDM symbols are extended in time to reduce the effect of symbol transition. However, instead of using a predefined filter shape, the signal value during the extended time is optimized, based on transmitted data and detected LU bands, to reduce the interferece to the licensed users.

Accordingly, disclosed is a method of reducing interference in radio and wireless communications by utilizing extended time domain orthogonal frequency-division multiplexing symbols. Based on identified licensed user information of locations and bandwidths, a symbol extension is selected using linear least squares optimization with quadratic constraint. Exemplary licensed user information includes a user location, a licensed user bandwidth, a licensed user frequency subcarrier, or a licensed user center frequency. The characteristics of interference to the licensed user are updated for every orthogonal frequency-division multiplexing symbol. In some instances, the sample information for at least one licensed user is upsampled. A first and second time domain symbol of an orthogonal frequency-division multiplexing symbol are obtained and the two symbols are added together to generate the transition symbol. The function described in equation (10) is then applied to the transition symbol to generate a minimum transition sample, which is appended to the end of the first time domain symbol of an orthogonal frequency-division multiplexing symbol. The second time domain symbol of an orthogonal frequency-division multiplexing symbol is then appended to the minimum transition sample, thereby suppressing signal side lobes.

In some embodiments, the method also includes modulating the orthogonal frequency division multiplexing signal and transforming the orthogonal frequency-division multiplexing signal to a time domain signal. Specific methods utilize N-point inverse Fast Fourier Transformation (IFFT) to transform the orthogonal frequency-division multiplexing signal to a time domain signal. In specific embodiments, a licensed user radio band is examined and upsampled to identify the radio signal properties. The use of the symbol extension produces an apodizing symbol. An apodizing function is a filter used to bring a subcarrier wireless transmission spectrum smoothly down to zero at the edges of the sampled region, thereby suppressing sidelobes which would otherwise be produced, but at the expense of widening the lines and therefore decreasing the resolution. Non-limiting examples of apodizing functions are described in (Naylor and Tahic, Apodizing functions for Fourier transform spectroscopy. J. Opt. Soc. Am. A. November 2007, 24:11, 3644-8). Other apodizing functions include Bartlet, Bartlett-Hann, Blackman, Blackman-Harris, Blackman-Nuttall, Connes, cosine, Hamming, Lanczos, haversine, rectangular, and triangular windowing.

For example, the apodization of the Hann window, a linear combination of modulated rectangular windows, in the Fast Fourier transform analyzer is given by $$w(n) = 0.5\left(1 - \cos\frac{2\pi n}{N-1}\right), \quad (1)$$

or $$w(n) = \sin^2\left(\frac{\pi n}{N-1}\right). \quad (2)$$

Applying the Euler formula provides $$w(n) = \frac{1}{2}w_r(n) - \frac{1}{4}e^{i2\pi\frac{n}{N-1}}w_r(n) - \frac{1}{4}e^{-i2\pi\frac{n}{N-1}}w_r(n) \quad (3)$$

applying the Fourier transform, its spectrum is $$\hat{w}(\omega) = \frac{1}{2}\hat{w}_r(\omega) + \frac{1}{4}\hat{w}_r\left(\omega + \frac{2\pi}{N-1}\right) + \frac{1}{4}\hat{w}_r\left(\omega - \frac{2\pi}{N-1}\right) \quad (4)$$

with the spectrum of the rectangular window $$\hat{w}_r(\omega) = e^{-i\omega\frac{N-1}{2}}\frac{\sin\left(\frac{N\omega}{2}\right)}{\sin\left(\frac{\omega}{2}\right)}, \quad (5)$$

such that the modulation factor vanished if windows are time-shifted around 0.

In certain embodiments, the linear least squares with quadratic constraint is calculated by determining the Hermitian transpose of the licensed user signal spectrum, calculating the mean-squared error for the licensed user signal spectrum using the Hermitian transpose and optimizing the mean-squared error. In specific embodiments, the mean-squared error is optimized using a singular value decomposition. In some embodiments of the invention, an orthogonal frequency-division multiplexing output signal is generated at a steady power level.

The transition sample resulting from the method is optionally constrained using the function of equation (12) using the transition symbol and symbol extension power. Peak-to-average-power ratio is optionally reduced using the function of equation (13) using the number of samples in the transition sample, number of samples in acyclic prefix, inverse fast fourier transfer size and the symbol energy prior to application of the adaptive symbol transition formula. Interference is further reduced by disabling at least one subcarrier operating in the licensed user band to suppress the interference.

Also disclosed is a method of reducing OFDM symbol interference using window filtering of time domain symbols of an orthogonal frequency-division multiplexing symbol. An OFDM transmission signal, which has undergone windowing, is received and processed into a first windowed value using a window function and offset as determined by a licensed user's location and bandwidth to generate a second windowed value. The time offset period is then determined and a time shift is applied to re-align the time-offset symbol period sample with the symbol sample, thereby re-aligning the second windowed value with corresponding first windowed value. The second windowed value and corresponding first windowed value are summed and converted to phases. In specific embodiments, the windowing function is apodizing.

Certain embodiments of the method include applying a first half of the windowing function to a first half of the time-offset symbol sample and applying a second half of the windowing function to a second half of the symbol sample. In specific embodiments, the summed windowed values and a first half of the symbol sample are exposed to a Fast Fourier Transform (FFT) transformer to un-transform the time-domain signal to a orthogonal frequency-division multiplexing signal.

Also envisioned is a system for reducing or suppressing wireless interference. The system utilizes an antenna adapted to receive and transmit signals on a plurality of radio wavelengths. For example, the antenna is useful for receiving licensed user information and for transmitting on various carrier frequencies so as to not interfere with a licensed user transmission. A cognitive engine, having an input from the antenna, is adapted to identify licensed user information, for example location and bandwidth information. A modulator adapted to modulate an orthogonal frequency-division multiplexing signal is optionally in communication, either through electrical or software connections, with a orthogonal frequency-divison multiplexing transformer which is adapted to transform the orthogonal frequency-division multiplexing signal to a time domain signal. A wireless interference suppression module, i.e. suppression module, includes a first input adapted to accept time domain orthogonal frequency-division multiplexing symbols, a second input adapted to accept a licensed user location and bandwidth information, and a logic module adapted to extend the orthogonal frequency-division multiplexing symbols. The logic module includes a module adapted to select a symbol extension using a linear least squares with quadratic constraint of the licensed user signal spectrum and a module adapted to insert the symbol extension onto the orthogonal frequency-division multiplexing symbol. The suppression module includes an output adapted to deliver the symbol extended time domain orthogonal frequency-division multiplexing symbols.

The interference suppression module of the present invention may be integrated into a cognitive radio. In specific embodiments, the cognitive radio also includes a modulator adapted to modulate an orthogonal frequency-division multiplexing signal, an orthogonal frequency-divison multiplexing transformer adapted to transform the orthogonal frequency-division multiplexing signal to a time domain signal, and a signal extension module adapted to insert at least one cyclic prefix onto the time domain signal. In one embodiment, the orthogonal frequency-divison multiplexing transformer is an N-point inverse fast Fourier transformer.

Some embodiments of the suppression module also include a cognitive radio engine adapted to examine a radio band for a licensed user. A serial to parallel (S/P) converter is optionally in electrical communication with the modulator and converts a serial bitstream of encoded data into several parallel bitstreams. A correlating parallel-to-serial (P/S) converter is optionally in electrical communication with the output of the modulator, to convert several parallel bitstreams into a serial bitstream of encoded data. An equalizer may be included in the system, such as by placing the equalizer in electrical communication with the orthogonal frequency-divison multiplexing transformer. In addition, at least one digital radio frequency filter is optionally in electrical communication with the antenna. The cognitive radio engine is adapted to upsample a radio signal from the licensed user for identification of the radio signal properties as provided in specific embodiments.

This allows wireless users to exploit available spectrum opportunities and achieve highest possible spectral efficiency while keeping the interference to detected LUs a minimum.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The disclosed method assumes use of a cognitive radio (CR) system employing OFDM signaling. The CR is assumed to be aware of the surrounding environment and the radio channel characteristics. After scanning the channel, the CR is able to identify LUs operating within the same band (D. Cabric, S. Mishna, and R. Brodersen, "Implementation issues in spectrum sensing for cognitive radios," in *Signals, Systems and Computers,* 2004. *Conference Record of the Thirty-Eighth Asilomar Conference on*, vol. 1, November 2004, pp. 772-776). The disclosed method is useful for other radio systems or devices employing OFDM signaling. As such, the methods disclosed herein are not limited to specific devices, but applies to any device that utilizes OFDM signaling.

Figure 2:
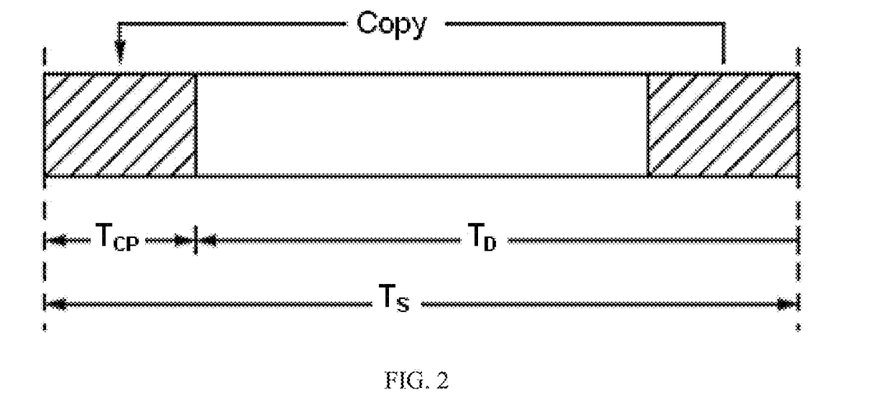
FIG. 2 is an illustration of the cylic prefix extension for OFDM systems.

OFDM signals can be considered as a composition of a large number of independent random signals using conventional modulation schemes at a low symbol rates. Since the duration of each symbol is long, guard intervals are commonly inserted between the OFDM symbols. The cyclic prefix, which is transmitted during the guard interval, consists of the end of the OFDM symbol copied into the guard interval, and the guard interval is transmitted followed by the OFDM symbol, as shown with reference to FIG. 2. Useful data duration and CP length are represented by $T_D$ and $T_{CP}$ respectively and they make up the total duration of OFDM symbol $T_S$, i.e. $T_S = T_D + T_{CP}$, as shown in FIG. 2.

Figure 3:
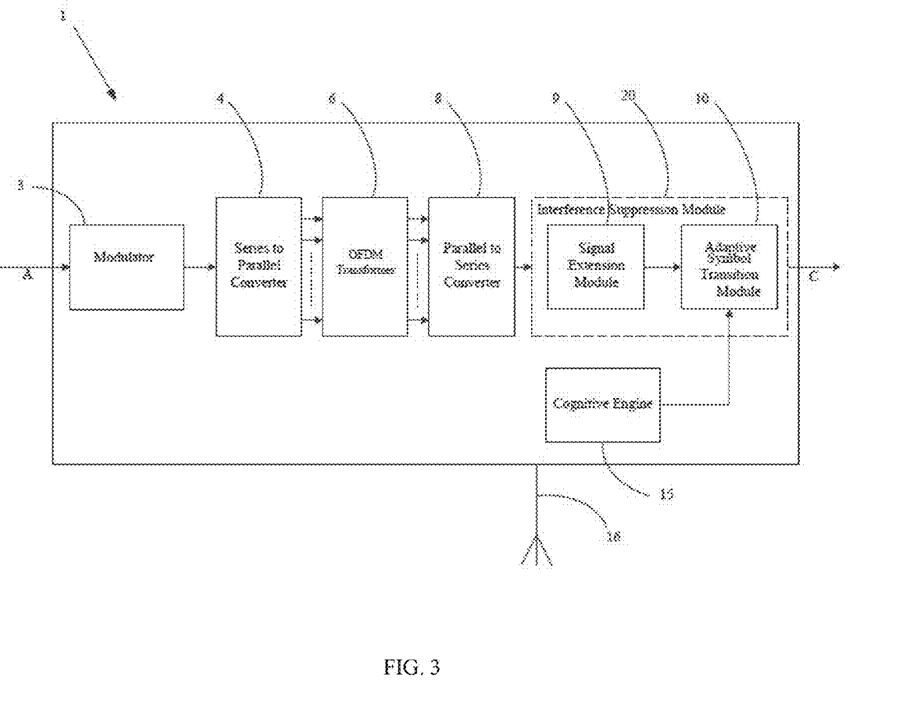
FIG. 3 is an illustrative diagram of a cognitive radio transmitter.

The system model of cognitive radio 1 is shown in FIG. 3. Encoded data A is transferred from the cognitive radio user and the encoded data is fed into the modulator 3, which modulates the data, which is then fed to a series to parallel (S/P) converter 4 and subsequently fed to orthogonal frequency-divison multiplexing transformer 6, which in one embodiment, is an inverse fast Fourier transform (IFFT) unit, thereby generating time domain signal B. Time domain signal B is fed to parallel-to-series (P/S) converter 8 and transferred to the signal extension module 9, which provides a cyclic prefic (CP) consisting of G samples. The signal extension module 9 is optionally a logic module including a module adapted to select a symbol extension using a linear least squares with quadratic constraint. The extended symbols ($Y^{(m)}$) are fed to the adaptive symbol transition (AST) unit 10. The cognitive engine 15 collects interference data on licensed users from multiple- or cooperative-antenna array 16, and transfers the licensed user (LU) operating information in the same band to the AST unit. The AST unit 10 generates a minimum transition sample based on the extended symbols and licensed-user information. The minimum transition sample is then appended to the time domain symbols to form extended signal C.

Figure 4:
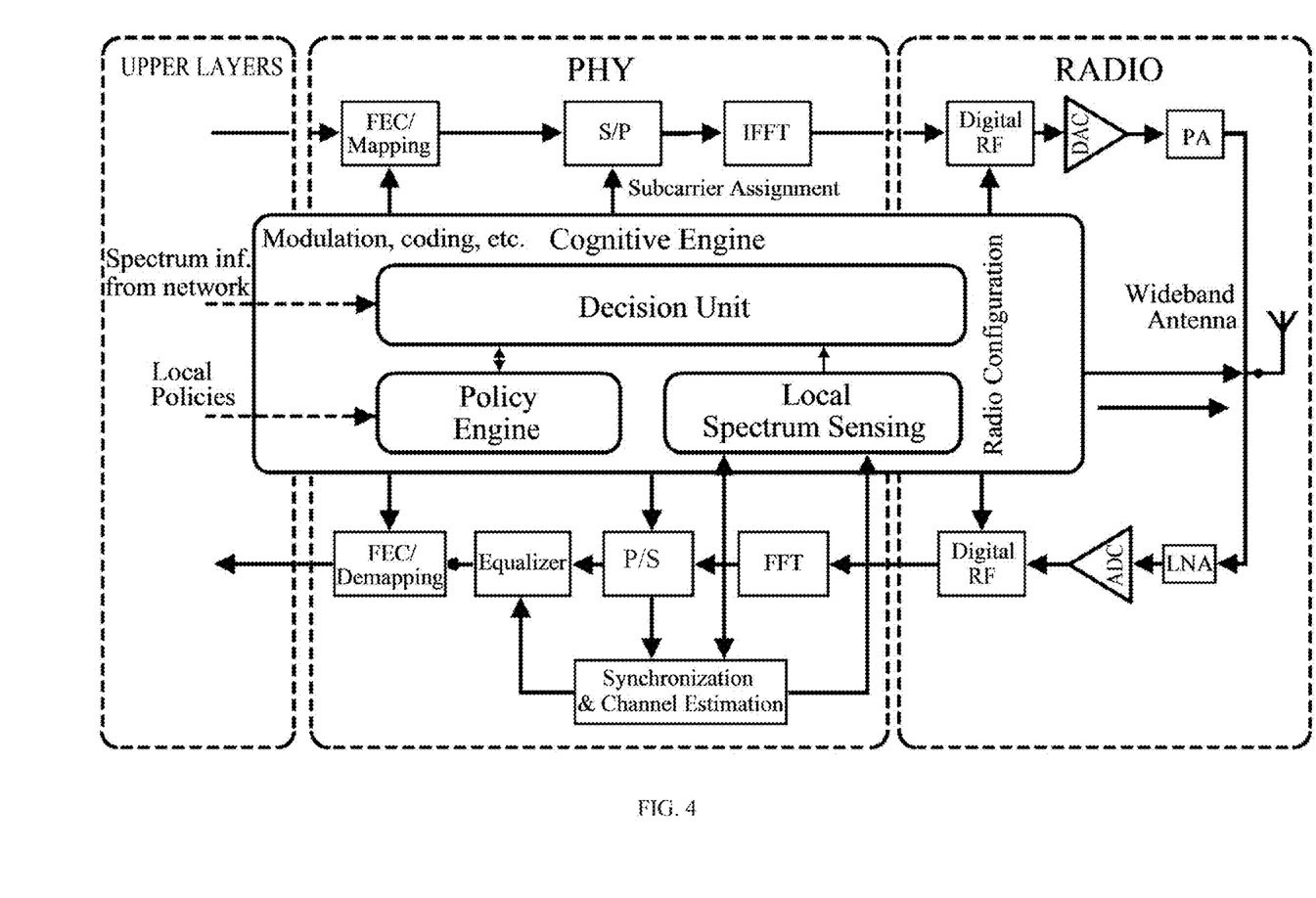
FIG. 4 is a flow diagram showing the steps used in the OFDM-based CR system. All of the layers can interact with the Cognitive engine. OFDM parameters and radio are configured by the Cognitive engine.

In operation of the invention, the encoded data from a licensed user is modulated and fed to an N-point inverse fast Fourier transform (IFFT) unit, as illustrated in FIG. 4. $F_{N1 \times N2} = \{F_{a1,a2}\}$ is defined as the $N_1$-point Fourier transform matrix of a vector of length $N_2$, where $$F_{n_1,n_2} = \exp\left(\frac{-j2\pi n_1 n_2}{N_1}\right). \tag{6}$$

The time domain signal at the output of the IFFT is then defined as $$x^{(m)} = \frac{1}{N} F_{N \times N}^* X^{(m)}, \tag{7}$$

where (m) is the symbol index, N is the IFFT size, $(.)^*$ is the complex conjugate operator, $1/N\ F^*$ is the inverse Fourier transform matrix, and $X^{(m)} = [X_1^{(m)}, X_2^{(m)}, \ldots, X_N^{(m)}]^T$ is the modulated data vector. The signal is then extended with a CP consisting of G samples. The extended symbols $(Y^{(m)})$ are fed to the AST unit, where the extension from the AST unit is added to extended symbol $Y^{(m)}$. Meanwhile, the cognitive engine passes required information regarding LUs operating in the same band to the AST unit. This information is used to suppress the interference, caused by OFDM sidelobes, to LUs as explained below.

Fixed windowing of OFDM symbols has been investigated as a method to suppress OFDM sidelobes (T. Weiss, et al. "Mutual interference in OFDM-based spectrum pooling systems," in *Proc. IEEE Veh. Technol. Conf.*, vol. 4, May 2004, pp. 1873-1877). The time domain symbols passed through a filter (usually raised cosine (RC) filters are used), and consecutive symbols are allowed to overlap. The process smoothes the transition between OFDM symbols and thus improves the spectral characteristics of the OFDM signal. To keep the orthogonality between OFDM subcarriers, the symbols are cyclically extended to cover the overlapping region. The advantage of this approach is its low computational complexity. The disadvantage is the reduced spectral efficiency due to the symbol extension.

With reference to FIG. 4, a method of reducing orthogonal frequency-division multiplexing symbol interference in accordance with the present invention includes obtaining a set of sample information for at least one licensed user operating in one or more licensed user bands, the set of sample information including at least one of a licensed user location, a licensed user bandwidth, a licensed user frequency subcarrier, or a licensed user center frequency 400 and performing an adaptive symbol transition function 415. The method may further include providing the transitioned time domain symbols to a fast fourier transform to transform the transitioned time domain symbols to orthogonal frequency-division multiplexing symbols 420. In a particular embodiment, the method may further include upsampling the set of sample information for the at least one licensed user to identify one or more licensed user radio signal properties 405 and disabling at least one subcarrier operating in the one or more licensed user bands 410 prior to performing an adaptive symbol transition function to form transition time domain symbols 415.

Figure 5:
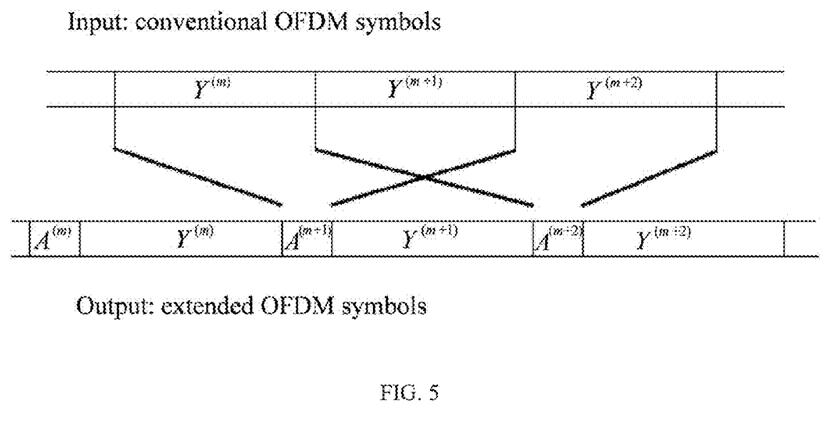
FIG. 5 is a diagram of the adaptive symbol transition output depicting the block extensions added to the orthogonal frequency division multiplexing symbol.

With reference to FIG. 5, the method step of performing an adaptive symbol transition function 415 described with reference to FIG. 4, may further include, providing a first time domain symbol of an orthogonal frequency-division multiplexing symbol 500 and providing a second time domain symbol of the orthogonal frequency-division multiplexing symbol 505. Performing an adaptive symbol transition function 415 may further include adding the first time domain symbol and the second time domain symbol together to obtain a transition symbol 510. The transition symbol may then be used for applying a function to generate a minimum transition symbol using an adaptive symbol transition module 515. The minimum transition symbol may then be appended to an end of the first time domain symbol of the transition symbol 520 and to the second time domain symbol of the transition symbol to form transitioned time domain symbols wherein the transitioned time domain symbols reduce interference by suppressing orthogonal frequency-division multiplexing symbol sidelobes 525.

EXAMPLE 1

Similar to windowing, the AST technique suppresses OFDM sidelobes by extending OFDM symbols and using the extensions to smooth the transition between consecutive symbols. However, instead of using a predefined window shape (e.g., RC), an adaptive method was used that calculates the value of the symbol extension based on LUs location and bandwidth.

Assume the CR system detects a LU signal spanning over K subcarriers $(X_{i+1}, X_{i+1}, \ldots X_{i+K})$, where $i\Delta f$ is the licensed signal offset with respect to the OFDM signal, $K\Delta f$ is the licensed signal bandwidth, and $\Delta f$ is the frequency subcarrier spacing. The above subcarrier set is disabled to avoid interfering with the LU. To further suppress the interference, the AST unit adds an extension $(A^{(m)} = [A_1^{(m)}, A_2^{(m)}, \ldots A_C^{(m)}]^T)$ to every OFDM symbol $(Y^{(m)})$ as shown in FIG. 5, where C is the number of samples in $A^{(m)}$. $Y^{(m)}$ and $Y^{(m-1)}$ are used to calculate $A^{(m)}$ in the following manner.

First, the interference to the LU is examined. The signal is upsampled by a factor v, or in other words, v points per subcarrier. The signal spectrum of two consecutive symbols is, $$S^{(m)} = F_{vN \times D}^* \underbrace{\begin{bmatrix} Y^{(m-1)} \\ A^{(m)} \\ Y^{(m)} \end{bmatrix}}_{Z^{(m)}}, \tag{8}$$

where D=2N+2G+C. The interference to the LU (I) is then, $$I_L = F_K Z_K^{(m)}, \tag{9}$$

where $F_K$ is a subset of $F_{vN \times D}$ containing only the rows that corresponds to the LU band (rows v(i+1) to v(i+K)) and is the same as $Z_K^{(m)}$ but with $A^{(m)} = [0]_{\times 1}$. To minimize interference power, the AST unit chooses $A^{(m)}$ such that, $$A^{(m)} = \underset{A^{(m)}}{\arg \min} \|F_I A^{(m)} + I_L\|^2, \tag{10}$$

where $F_I$ is a subset of $F_K$ containing only the columns that corresponds to $A^{(m)}$ columns N+G to N+C+G−1.

The mean-squared-error (MSE) solution to (10) is, $$A_{min}^{(m)} = -(F_I^H F_I)^{-1} F_I^H I_L, \tag{11}$$

where $(.)^H$ is the Hermitian transpose. However, (11) can result in very high values. This leads to increase in the signal PAPR. In addition, the useful symbol energy is reduced compared to the total symbol energy resulting in an increase in the system BER. To mitigate this effect, a constraint was added on the minimization in (10) such that the symbol extension power is below a given level ($\alpha^2$), $$\|A^{(m)}\|^2 \leq \alpha^2. \tag{12}$$

The optimization in (10) and (12) is known as linear least squares problem with a quadratic constraint which can be solved using generalized singular value decomposition (W. Gander, "Least squares with a quadratic constraint," *Numerische Mathematik*, vol. 36, no. 3, pp. 291-307, 1980). Fortunately, for a given spectrum shape, $F_I$ is fixed and thus, only $I_L$ needs to be updated for every OFDM symbol. The computational complexity of the optimization problem is reduced significantly due to this fact.

Figure 6:
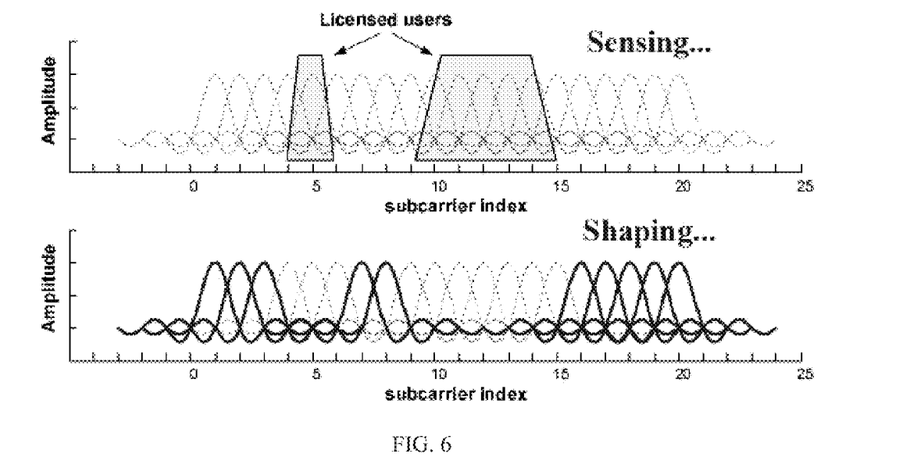
FIG. 6 is a graph showing the spectrum sensing and shaping using OFDM.

An important parameter for OFDM systems is the PAPR. By choosing $\alpha^2$ such that, $$\alpha^2 = \frac{C}{N+G} E_S, \tag{13}$$

the signal average power is kept at the same level, where $E_S$ is the symbol energy prior to the AST unit. Since the AST signal is optimized to smooth the symbol transition, as seen in FIG. 6, it does not introduce any peaks to the signal and, thus, the PAPR of the system does not increase. On the other hand, the AST reduces the useful symbol energy. Using (13), the worst case signal-to-noise ratio (SNR) loss ($\gamma$) is, $$\gamma = 10 \cdot \log_{10}\left(\frac{E_S + \alpha^2}{E_S}\right) dB. \tag{14}$$

By controlling C and for a fixed PAPR, where (14) is used, the system has a tradeoff between reducing $\gamma$ (reducing C), or improving the interference suppression (increasing C).

It is noteworthy that since AST technique is performed on time-domain symbols, the performance is not sensitive to the CP size. In addition, the AST does not introduce any inter-symbol interference (ISI) to the system as the leakage from the symbol extension is contained in the CP. The intended receiver can remove the AST extension along with the CP to maintain an ISI-free signal.

EXAMPLE 2

The AST technique suppresses OFDM sidelobes by extending OFDM symbols and using the extensions to smooth the transition between consecutive symbols in a manner similar to windowing, but using an adaptive symbol extension based on LUs location and bandwidth. The adaptive method that calculates the value of the symbol extension based on LU center frequency and bandwidth signal. In this example, a first symbol is obtained and a prefix and suffix for the first symbol determined based on a licensed user's information, namely locations and bandwidths. The determined prefix and suffix are appended onto the first symbol. For example, the first symbol is extended with a CP consisting of G samples and the extended symbols $y_{(m)}$ are fed to the AST unit. A second symbol is obtained and a prefix and suffix for the first symbol determined based on a licensed user's information, namely locations and bandwidths. In some situations, the licensed user's information obtained during the first symbol stage is used for the second symbol, however the prefix and suffix information will differ. The determined prefix and suffix are appended onto the second symbol. The suffix of the first symbol is overlapped with the prefix of the second symbol, such that the overlap occurs in time, and the overlapped prefix and suffix are windowed, such as by applying a raised cosine window. However, other windowing techniques are within the scope of this disclosure, and would be within the skill of an artisan to utilize in place of the raised cosine window. The windowing generates a smooth transition from the first symbol to the second symbol. A linear least squares problem with a quadratic inequality constraint is used to mitigate the effect of reduced useful symbol energy.

The cognitive engine may also transmit information regarding LU operating in the same band to both the subcarrier mapper and the AST unit, which is to disable subcarriers operating in the LU bands and to suppress the interference.

Assume the CR system detects an LU signal spanning over K subcarriers (Xi+1, Xi+2, ... Xi+K), where $i\Delta f$ is the licensed signal offset with respect to the OFDM signal, $K\Delta f$ is the licensed signal bandwidth, and $\Delta f$ is the frequency subcarrier spacing. The above subcarrier set is disabled to avoid interfering with the LU. To further suppress the interference, the AST unit adds an extension $$a^{(m)} = [a_1^{(m)}, a_2^{(m)}, \ldots a_C^{(m)}]^T, \tag{15}$$

to every OFDM symbol $y^{(m)}$ as shown in FIG. 2, where C is the number of samples in $a^{(m)}$, $y^{(m)}$ and $y^{(m-1)}$ are used to calculate $a^{(m)}$ in the following manner.

First, the characteristics of interference to the LU was examined. The signal is upsampled by a factor $\zeta$, or in other words, $\zeta$ points per subcarrier were consider. The signal spectrum of two consecutive symbols can be obtained as, $$S^{(m)} = F_{\zeta N, \beta} \begin{bmatrix} y^{(m-1)} \\ a^{(m)} \\ y^{(m)} \end{bmatrix}, \tag{16}$$

$$\underbrace{\phantom{\begin{bmatrix} y^{(m-1)} \\ a^{(m)} \\ y^{(m)} \end{bmatrix}}}_{z^{(m)}}$$

where $\beta = 2N+2G+C$. The characteristics of interference to the LU is then, $$I_L = F_K z_K^{(m)}, \tag{17}$$

where $F_K$ is a subset of $F_{\zeta N, \beta}$ containing only the rows that corresponds to the LU band (rows $\zeta(i+1)$ to $\zeta(i+K)$) and $z^{(m)}$ is the same as $z^{(m)}$ but with $a^{(m)} = [0]_{C \times 1}$. To minimize interference power, the AST unit chooses $a^{(m)}$ such that, $$a^{(m)} = \underset{A^{(m)}}{\arg\min} \|F_I A^{(m)} + I_L\|^2, \tag{18}$$

where $F_I$ is a subset of $F_K$ containing only the columns that corresponds to $a^{(m)}$; columns N+G to N+G+C−1.

The mean-squared-error (MSE) solution to (18) can result in very high values for $a^{(m)}$. This leads to increase an in the extension power. As a result, the useful symbol energy is reduced compared to the total symbol energy resulting in an increase in the system BER. To mitigate this effect, a constraint on the minimization in (18) was added such that the symbol extension power is below a given level $\alpha^2$, $$\|A^{(m)}\|^2 \leq \alpha^2. \qquad (19)$$

The optimization in (18) and (19) is known as linear least squares problem with a quadratic inequality constraint (Gander, Least squares with a quadratic constraint, *Numerische Mathematik*, vol. 36, no. 3, pp. 291-307, 1980). Using singular value decomposition (SVD), provided the following, $$U^H F_I V = \begin{bmatrix} D_{FI} \\ 0 \end{bmatrix}, \qquad (20)$$

and $$D_{FI} = \text{diag}(v_1, \ldots, v_c), \; v_1 \geq 0, \qquad (21)$$

where $(.)^H$ is the Hermitian transpose, $[U]_{Y \times Y}$ and $[V]_{C \times C}$ are unitary, and $Y = \zeta(K-1)+1$. Using the method of Lagrange multipliers provides the following equation, $$f(\lambda) = \sum_{i=1}^{C} \frac{-v_i^2 |\tilde{I}_{L,i}|^2}{(v_i^2 + \lambda)} = \alpha^2, \qquad (22)$$

where $\tilde{I}_L = U^H I_L = [\tilde{I}_{L,1}, \ldots, \tilde{I}_L, Y]^T$. If a solution exist to the optimization problem, the function $f(\lambda)$ will have a unique positive root and it has been shown that this is the desired root (Gander, Least squares with a quadratic constraint, *Numerische Mathematik*, vol. 36, no. 3, pp. 291-307, 1980). The solution can then be obtained as, $$a^{(m)} = V\left[-v_1 \tilde{I}_{L,1}/(v_1^2 + \tilde{\lambda}), \ldots, -v_1 \tilde{I}_{L,C}/(v_C^2 + \tilde{\lambda})\right]^T \qquad (23)$$

where $\lambda$ is the unique positive root of (22). Fortunately, for a given spectrum shape, $F_I$ is fixed and thus, only $\tilde{I}_L$ needs to be updated for every OFDM symbol. The computational complexity of the optimization problem is reduced significantly due to this fact.

An important parameter for OFDM systems is the PAPR which affects the dynamic range over which the system should be linear. By choosing $\alpha^2$ such that, $$\alpha^2 = \frac{C}{N+G} E_S, \qquad (24)$$

the signal average power is kept at the same level, where ES is the symbol energy prior to the AST unit. Since the AST signal is optimized to smooth the symbol transition, it does not introduce any peaks to the signal (confirmed by simulation results) and, thus, the PAPR of the system does not increase. Nevertheless, the AST reduces the useful symbol energy. Using (24), the maximum signal-to-noise ratio (SNR) loss $\gamma$ is, $$\gamma = 10 \cdot \log_{10}\left(\frac{E_S + \alpha^2}{E_S}\right) = 10 \cdot \log_{10}\left(1 + \frac{C}{N+G}\right) dB. \qquad (25)$$

By controlling C and for a fixed PAPR, the system has a tradeoff between reducing $\gamma$ (reducing C), or improving the interference suppression (increasing C).

EXAMPLE 3

Figure 7:
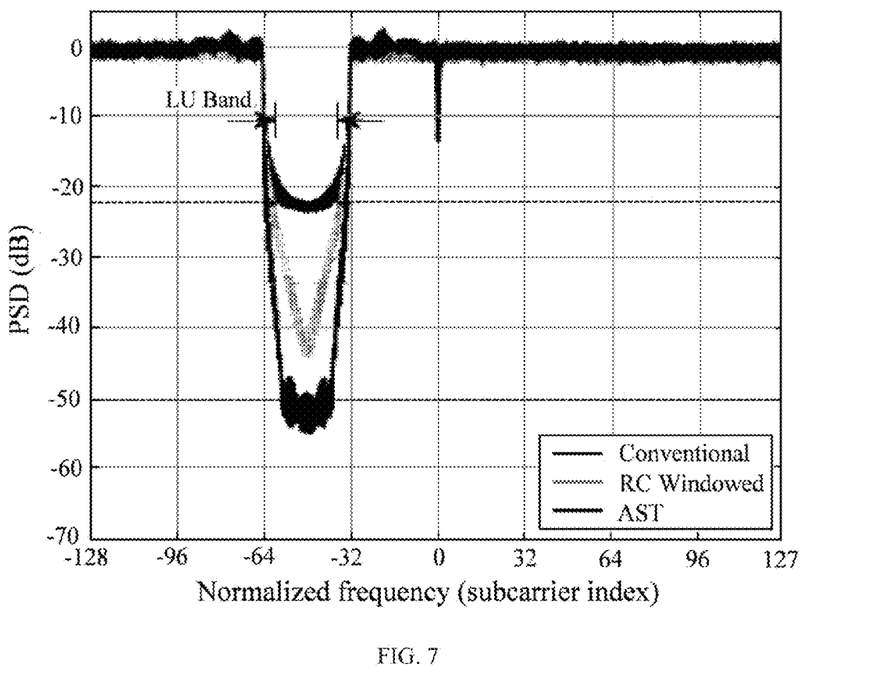
FIG. 7 is a graph of the power spectral density for an orthogonal frequency division multiplexing signal with adaptive symbol transition block with 32 subcarrier gaps.

The performance of the proposed method was investigated with computer simulations using an OFDM-based CR system with N=256, G=16. The AST method was used with C=16, v=16, and $\alpha^2$=0.06 $E_S$ and the DC subcarrier was disabled. Data subcarriers were modulated with a QPSK signal. All results shown were averaged over 10,000 OFDM symbols. Two cases were considered for performance evaluation. In the first case, a LU was detected spanning 24 OFDM subcarriers. The system disabled 32 subcarriers leaving a guard band of 4 subcarriers on each side of the LU band. The guard bands were to allow the signal power to decay while the AST unit performs the optimization over the 24-subcarrier band. The normalized power spectral density (PSD) of the signal at the output of the AST unit was measured, shown in FIG. 7. The system performance was compared with a conventional OFDM system without any symbol extension; and with an OFDM system using RC windowing, and a symbol duration equal to the AST system. The conventional OFDM system suffers an interference level of −22 dB. The RC-windowed system suppressed the interference to −33 dB, while the AST reduced the interference further to less than −50 dB. The AST method achieved a 28 dB gain over conventional systems while keeping the SNR loss, $\gamma \leq 0.25$ dB. Compared to the results presented in (S. Brandes, I. Cosovic, and M. Schnell, "Reduction of out-of-band radiation in OFDM systems by insertion of cancellation carriers," *IEEE Commun. Lett.*, vol. 10, no. 6, pp. 420-422, 2006; I. Cosovic; S. Brandes, and M. Schnell, "Subcarrier weighting: a method for sidelobe suppression in OFDM systems." *IEEE Commun. Lett.*, vol. 10, no. 6, pp. 444-446, June 2006), the AST shows a superior performance in both interference suppression and SNR loss.

Figure 8:
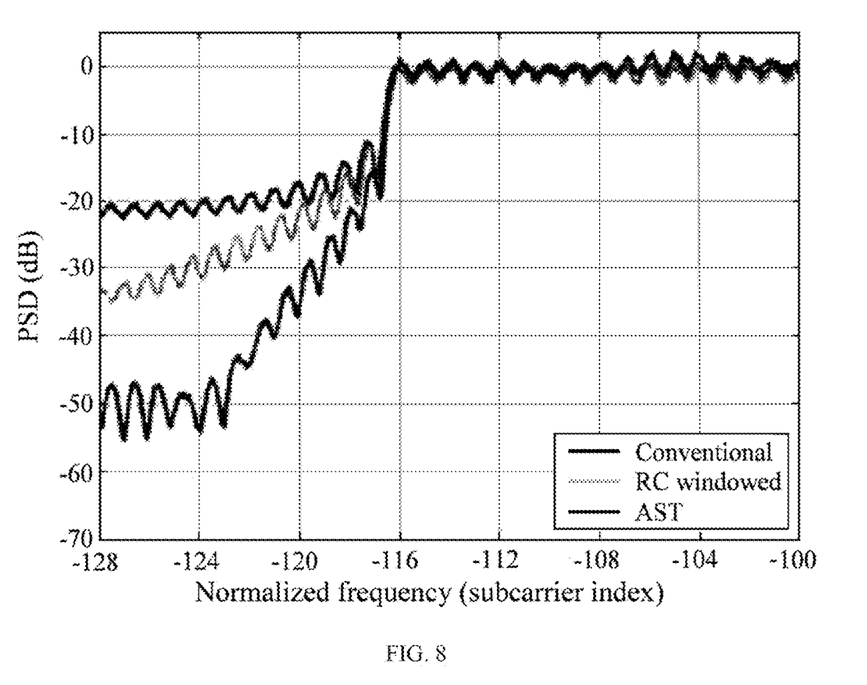
FIG. 8 is a graph of the power spectral density for an orthogonal frequency division multiplexing signal with adaptive symbol transition block with 16 subcarrier guard bands.

Finally, in the second case an AST method was used to reduce the number of disabled subcarriers used as guard bands in current OFDM systems. For example, a WiMAX system employing a 256 subcarriers OFDM system disables 55 subcarriers (28 and 27 on the left and right sides, respectively) to limit out-of-band radiations. Using sidelobe suppression techniques, the required guard band was reduced for an increase in system complexity. 24 subcarriers (12 on each side) as guard bands. N, C, C, u, and $\alpha^2$ were the same as the first case. The normalized PSD of the left side of the signal is shown in FIG. 8. The AST method suppresses the signal power to −50 dB by the end of the in-band signal compared to −32 dB for RC-window method and −20 dB for conventional systems.

A new method to suppress OFDM sidelobes and shape the spectrum of OFDM signals is presented. The proposed AST technique extends the OFDM symbols and uses that extension to reduce ACI to other users operating in the same band. Simulation results show that AST can achieve a significant gain over conventional sidelobe suppression techniques. Moreover, AST does not increase the signal PAPR and keeps a low SNR loss.

The present invention may be embodied on various computing platforms that perform actions responsive to software-based instructions. The Wowing provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of the present invention, it will be apparent to those skilled in the art that variations and modifications are possible without deviating from the broad spirit and principle of the invention. It is also to be understood that the following claims are intended to cover all of the generic and specific features of the invention herein described, and all statements of the scope of the invention which, as a matter of language, might be said to fall therebetween.

What is claimed is:

1. A system for reducing orthogonal frequency-division multiplexing symbol interference, the system comprising:
   an antenna adapted to receive and transmit signals on a plurality of radio wavelengths;
   a cognitive radio engine to receive one or more signals from the antenna and to identify a licensed user location and bandwidth information from the signals received from the antenna;
   a modulator to receive encoded data from a cognitive radio user and to modulate the encoded data to generate modulated encoded data;
   an orthogonal frequency-division multiplexing transformer in electrical communication with the modulator, the orthogonal frequency-division multiplexing transformer to receive the modulated encoded data from the modulator and to transform the modulated encoded data to time domain orthogonal frequency-division multiplexing symbols;
   an interference suppression module comprising:
      a first input to receive the time domain orthogonal frequency-division multiplexing symbols from the orthogonal frequency-division multiplexing transformer;
      a second input to receive the licensed user location and bandwidth information from the cognitive radio engine;
      a signal extension module comprising logic to select a symbol extension for the time domain orthogonal frequency-division multiplexing symbols using a linear least squares with quadratic constraint of the licensed user location and bandwidth information;
      an adaptive symbol transition module comprising logic to extend the time domain orthogonal frequency-division multiplexing symbols by generating a minimum transition symbol based on the symbol extension selected by the signal extension module the licensed user location and bandwidth information, the adaptive symbol transition module further configured to append the minimum transition symbol to the time domain orthogonal frequency-division multiplexing symbols to generate symbol extended time domain orthogonal frequency-division multiplexing symbols; and an output adapted to deliver the symbol extended time domain orthogonal frequency-division multiplexing symbols.

2. The system of claim 1, wherein the adaptive symbol transition module is further configured for providing a first time domain symbol of an orthogonal frequency-division multiplexing symbol, providing a second time domain symbol of the orthogonal frequency-division multiplexing symbol, adding the first time domain symbol and the second time domain symbol together to obtain a transition symbol, applying a function to generate the minimum transition symbol, the function being:

$$A^{(m)} = \genfrac{}{}{0pt}{}{\arg\min}{A^{(m)}} \|F_I A^{(m)} + I_L\|^2,$$

where $A^{(m)}$ is the minimum transition symbol, $F_I$ is a subset of sample information for at least one licensed user, $I_L$ is interference to the licensed user, appending the minimum transition symbol to an end of the first time domain symbol of the transition symbol and appending the second time domain symbol of the transition symbol to the minimum transition symbol to form transitioned time domain symbols.

3. The system of claim 2, wherein the minimum transition symbol is constrained by $$\|A^{(m)}\|^2 \leq \alpha^2$$

where $\alpha^2$ is a symbol extension power.

4. The system of claim 1, further comprising a parallel-to-series (P/S) converter in electrical communication with an output of the modulator, where the parallel-to-series (P/S) converter converts several parallel bitstreams of modulated encoded data into a serial bitstream of modulated encoded data.

5. The system of claim 1, further comprising at least one digital radio frequency filter, where the digital radio frequency filter is in electrical communication with the antenna.

6. The system of claim 1, wherein the signal extension module is further adapted to provide a cyclic prefix for the time domain frequency-division multiplexing symbols.

7. The system of claim 1, further comprising a series to parallel (S/P) converter in electrical communication with an input of the modulator, wherein the series to parallel (S/P) converter converts a serial bitstream of encoded data into several parallel bitstreams.

8. One or more non-transitory computer-readable media having computer-executable instructions for performing a method of running a software program on a computing device, the computing device operating under an operating system, the method including issuing instructions from the software program comprising:

obtaining a set of sample information for at least one licensed user operating in one or more licensed user bands, the set of sample information including at least one of a licensed user location, a licensed user bandwidth, a licensed user frequency subcarrier, or a licensed user center frequency;

performing an adaptive symbol transition function, including:

providing a first time domain symbol of an orthogonal frequency-division multiplexing symbol;

providing a second time domain symbol of the orthogonal frequency-division multiplexing symbol;

adding the first time domain symbol and the second time domain symbol together obtain a transition symbol;

applying a function to generate a minimum transition symbol using an adaptive symbol transition module, the function being:

$$A^{(m)} = \genfrac{}{}{0pt}{}{\arg\min}{A^{(m)}} \|F_I A^{(m)} + I_L\|^2,$$

where $A^{(m)}$ is the minimum transition symbol, $F_I$ is a subset of sample information for at least one licensed user, $I_L$ is interference to the licensed user;

appending the minimum transition symbol to an end of the first time domain symbol of the transition symbol; and appending the second time domain symbol of the transition symbol to the minimum transition symbol to form transitioned time domain symbols, wherein the transitioned time domain symbols reduce interference by suppressing orthogonal frequency-division multiplexing sidelobes.

9. The one or more non-transitory computer-readable media of claim 8, wherein the minimum transition symbol is constrained by $$\|A^{(m)}\|^2 \leq \alpha^2$$

where $\alpha^2$ is a symbol extension power.

10. The one or more non-transitory computer-readable media of claim 8, further comprising instructions for:

reducing peak-to-average-power ratio by applying the formula:

$$\alpha^2 = \frac{C}{N+G} E_S$$

wherein C is the number of samples in the transition symbol, G is the number of samples in a cyclic prefix, N is the inverse fast fourier transform size, and $E_S$ is the symbol energy prior to performing the adaptive symbol transition function.

11. The one or more non-transitory computer-readable media of claim 8, further comprising instructions for, providing the transitioned time domain symbols to a fast fourier transform to transform the transitioned time domain symbols to orthogonal frequency-division multiplexing symbols.

12. The one or more non-transitory computer-readable media of claim 8, further comprising instructions for updating characteristics of the interference to the licensed user for every orthogonal frequency-division multiplexing symbol.

13. The one or more non-transitory computer-readable media of claim 8, further comprising instructions for upsampling the set of sample information for the at least one licensed user to identify one or more licensed user radio signal properties.

14. The one or more non-transitory computer-readable media of claim 8, further comprising instructions for disabling at least one subcarrier operating in the one or more licensed user bands prior to performing the adaptive symbol transition function.

\* \* \* \* \*